United States Patent
Wada et al.

(10) Patent No.: US 12,379,509 B2
(45) Date of Patent: Aug. 5, 2025

(54) RADIATION DETECTOR, RADIATION IMAGING SYSTEM, RADIATION IMAGE PROCESSING METHOD, AND STORAGE MEDIUM

(71) Applicant: CANON KABUSHIKI KAISHA, Tokyo (JP)

(72) Inventors: Zempei Wada, Saitama (JP); Takanori Watanabe, Kanagawa (JP); Jun Iba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 18/137,504

(22) Filed: Apr. 21, 2023

(65) Prior Publication Data
US 2023/0341568 A1 Oct. 26, 2023

(30) Foreign Application Priority Data

Apr. 22, 2022 (JP) ................................. 2022-070670
Feb. 14, 2023 (JP) ................................. 2023-020419

(51) Int. Cl.
*G01T 1/24* (2006.01)
*G01N 23/04* (2018.01)
*G01N 23/06* (2018.01)

(52) U.S. Cl.
CPC .............. *G01T 1/24* (2013.01); *G01N 23/04* (2013.01); *G01N 23/06* (2013.01)

(58) Field of Classification Search
CPC ........... G01T 1/24; G01N 23/04; G01N 23/06
See application file for complete search history.

(56) References Cited

U.S. PATENT DOCUMENTS

| | | | |
|---|---|---|---|
| 2003/0213915 A1* | 11/2003 | Chao | H01L 27/14643 438/73 |
| 2004/0036010 A1* | 2/2004 | Hsieh | H04N 25/75 257/E31.062 |
| 2006/0146161 A1* | 7/2006 | Farrier | H01L 27/14609 348/E3.018 |
| 2006/0181627 A1* | 8/2006 | Farrier | H04N 25/707 348/E3.018 |
| 2007/0075888 A1* | 4/2007 | Kelly | H03M 1/145 341/155 |
| 2016/0349228 A1* | 12/2016 | Kester | G01N 33/0044 |
| 2017/0064226 A1* | 3/2017 | Ishii | H04N 25/704 |
| 2019/0280025 A1* | 9/2019 | Sakakibara | H01L 27/142 |
| 2020/0059242 A1* | 2/2020 | Moue | H04N 25/78 |
| 2022/0385837 A1* | 12/2022 | Pryor | H04N 25/766 |
| 2022/0385838 A1* | 12/2022 | Weisfield | G01T 1/24 |

FOREIGN PATENT DOCUMENTS

JP 2008-524874 A 7/2008

\* cited by examiner

*Primary Examiner* — Hugh Maupin
(74) *Attorney, Agent, or Firm* — Venable LLP

(57) ABSTRACT

A radiation detector includes a plurality of pixels configured to directly convert a radiation into an electric charge, a reading circuit configured to read pixel signals from the plurality of pixels for each frame, and a processing unit configured to process the pixel signals read by the reading circuit, wherein the processing unit is configured to determine a background component contained in a pixel signal of each of the plurality of pixels by using values of the pixel signals read from the plurality of pixels in a frame in which the pixel signal whose background component is to be determined is read.

20 Claims, 12 Drawing Sheets

■ 703
▨ 704
☐ 705

RADIATION DETECTOR, RADIATION IMAGING SYSTEM, RADIATION IMAGE PROCESSING METHOD, AND STORAGE MEDIUM

BACKGROUND OF THE INVENTION

Field of the Invention

This disclosure relates to a radiation detector, a radiation imaging system, a radiation image processing method, and a storage medium.

Description of the Related Art

In a case of detecting a radiation such as an X-ray and an electron beam by direct conversion type radiation detectors, the removal of a background component (noise component) attributable to such as the deterioration of apparatuses exposed to the radiation is required. Japanese Patent Laid-Open No. 2008-524874 describes that, in an X-ray image pickup system detecting the X-ray by a complementary metal oxide semiconductor image sensor (CMOS image sensor), uncorrected pixel signals (pixel values) of an individual image frame are corrected (calibrated) based on pixel signals of the same pixels from a different image frame. According to this literature, correction factors for correcting the uncorrected pixel signals are calculated by performing, at a time different from performing the imaging of imaging objectives, a predetermined calibration process including a step of measuring levels of dark currents in a state where the radiation is not emitted.

However, in the abovementioned literature, the imaging of the imaging objective and the calibration process are not performed at the same time. Therefore, due to changes (such as a temperature rise in the radiation detector) generated between both points in time, there is a possibility that the background components at a time of performing the imaging may vary from the background components at a time of the calibration process.

Further, in the abovementioned literature, besides an X-ray imaging camera (radiation detector) converting the radiation image into electrical image data, an image processor for correcting (calibrating) the image data is needed in a configuration.

SUMMARY OF THE INVENTION

This disclosure provides a radiation detector, a radiation imaging system, a radiation image processing method, and a storage medium that are capable of obtaining background components having synchronicity with the imaging of an imaging objective.

According to an aspect of the invention, a radiation detector includes a plurality of pixels configured to directly convert a radiation into an electric charge, a reading circuit configured to read pixel signals from the plurality of pixels for each frame, and a processing unit configured to process the pixel signals read by the reading circuit, wherein the processing unit is configured to determine a background component contained in a pixel signal of each of the plurality of pixels by using values of the pixel signals read from the plurality of pixels in a frame in which the pixel signal whose background component is to be determined is read.

According to another aspect of the invention a method for processing a radiation image includes reading pixel signals for each frame from a plurality of pixels which are configured to directly convert a radiation into an electric charge, and processing the pixel signals read from the plurality of pixels, wherein in the processing step, a background component contained in a pixel signal of each of the plurality of pixels is determined by using values of the pixel signals read from the plurality of pixels in a frame in which the pixel signal whose background component is to be determined is read.

Further features of the present invention will become apparent from the following description of exemplary embodiments with reference to the attached drawings.

DESCRIPTION OF THE EMBODIMENTS

Hereinafter, embodiments of this disclosure will be described with reference to drawings.

In the following description, a radiation is a concept including an electromagnetic radiation (e.g., X-ray, gamma ray) and a particle radiation (electron beam, proton beam, neutron beam, alpha ray, and the like). A radiation imaging system means a general system which obtains an image of an imaging objective (object, such as a patient in a case of a medical imaging system) as electronic data by using the radiation. The image may be either a still image or a moving image. A radiation detector includes an image sensor unit (camera, also called as an imaging unit) which is a component of the radiation imaging system and obtains the image by converting a radiation image of the imaging objective into the electronic data.

In the following embodiments, a direct conversion type radiation detector including a conversion element directly converting an incident radiation into an electric charge will be described as the radiation detector.

First Embodiment

Figure 1:
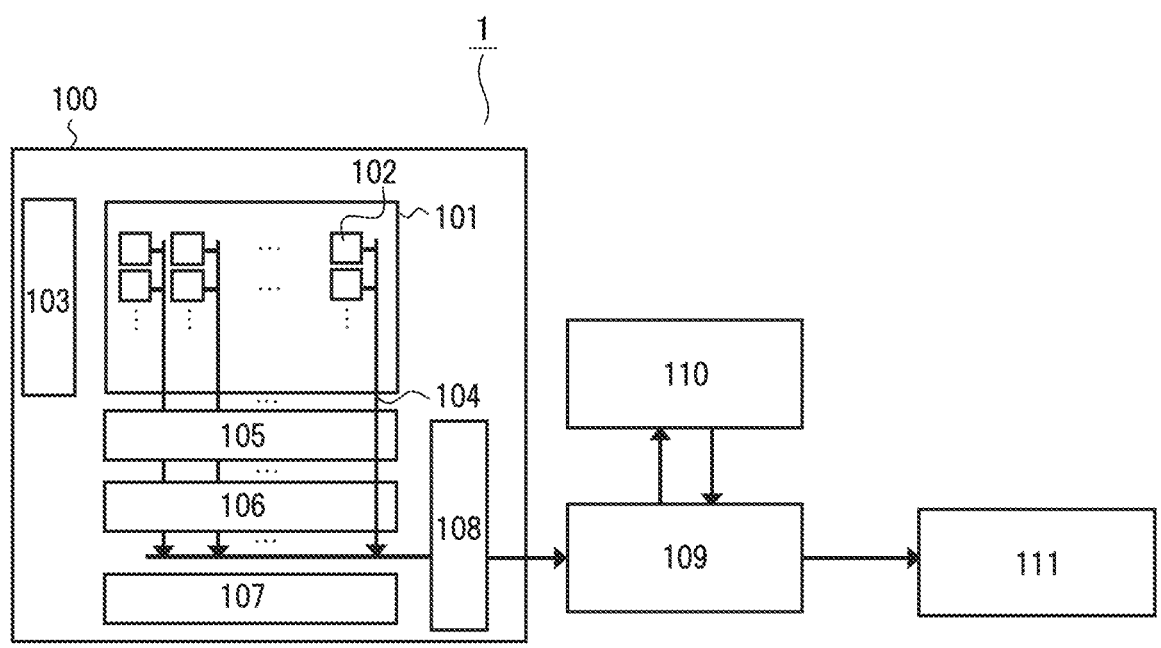
FIG. 1 is a block diagram illustrating a schematic configuration of a radiation detector of a first embodiment.

FIG. 1 is a block diagram illustrating a schematic configuration of a radiation detector 1 of a first embodiment.

The radiation detector 1 includes an image sensor 100, an output signal processing section 109, a memory section 110, and an external interface (external I/F) 111.

The image sensor 100 includes a pixel array 101 including a plurality of pixels 102 disposed in a matrix, a vertical scanning circuit 103, a vertical signal line 104, a column circuit 105, a column memory 106, a horizontal scanning circuit 107, and a digital front end (DFE) 108. The vertical scanning circuit 103, the vertical signal line 104, the column circuit 105, the column memory 106, and the horizontal scanning circuit 107 are examples of a reading circuit reading a pixel signal from each pixel of the pixel array 101 for each frame. The DFE 108 is an example of a processing unit processing the pixel signal read by the reading circuit. The image sensor 100 is a complementary metal oxide semiconductor image sensor (CMOS image sensor) that is configured to detect the radiation.

The pixel 102 included in the pixel array 101 converts the incident radiation into the electric charge. A configuration of the pixel 102 will be described below. The vertical scanning circuit 103, in the pixel array 101, scans sequentially in conjunction with selecting a pixel row to which a signal is output. The vertical signal line 104 transmits the signal from the pixel 102 selected by the vertical scanning circuit 103. The column circuit 105 processes the signal input from the vertical signal line 104. The processing performed by the column circuit 105 includes, for example, an analog/digital conversion (A/D conversion). The column memory 106 holds a digital signal output from the column circuit 105. The horizontal scanning circuit 107 scans the column circuit 105 or the column memory 106 in a direction of the pixel row, and sequentially reads the digital signal for each row. The DFE 108 is an output circuit processing the digital signal read from the column circuit 105 or the column memory 106 and outputting the digital signal to the outside of the image sensor 100.

The image data including one set of the pixel signals (pixel values) read from each of the pixels 102 of the pixel array 101 by scanning in the vertical and horizontal directions is referred to as a frame image. A period during which the image sensor 100 operates so as to obtain one frame image is called as a frame or a frame period. When the frame image is repeatedly obtained for such as movie shooting, the number of the frame images per unit of time is called as a frame rate (frames per second: fps).

It is acceptable that the frame image is an image (also called as a subframe or a time division frame) which is used to constitute one image by merging a plurality of frame images in a subsequent step. Further, it is acceptable that the radiation detector 1 is a detector which performs photon counting (in a case of a corpuscular ray, particle counting) based on the pixel signal in the frame image obtained by image sensor 100. In that case, it is acceptable to distinguish the energy of the radiation based on a value of the pixel signal corresponding to one radiation To be noted, it is acceptable that the image sensor 100 includes a pixel whose read signal does not constitute the frame image (refer to a pixel array 802 for an arithmetic operation in a fourth embodiment described below).

The output signal processing section 109 performs the arithmetic processing of the signal output from the image sensor 100. The memory section 110 is a data holding unit (storage area) for a calculation in the output signal processing section 109, and stores data of a processing objective and predetermined data. The signal output from the output signal processing section 109 is output to the outside of the radiation detector 1 (for example, other units incorporated into the radiation imaging system, described below) via the external I/F 111.

Figure 2:
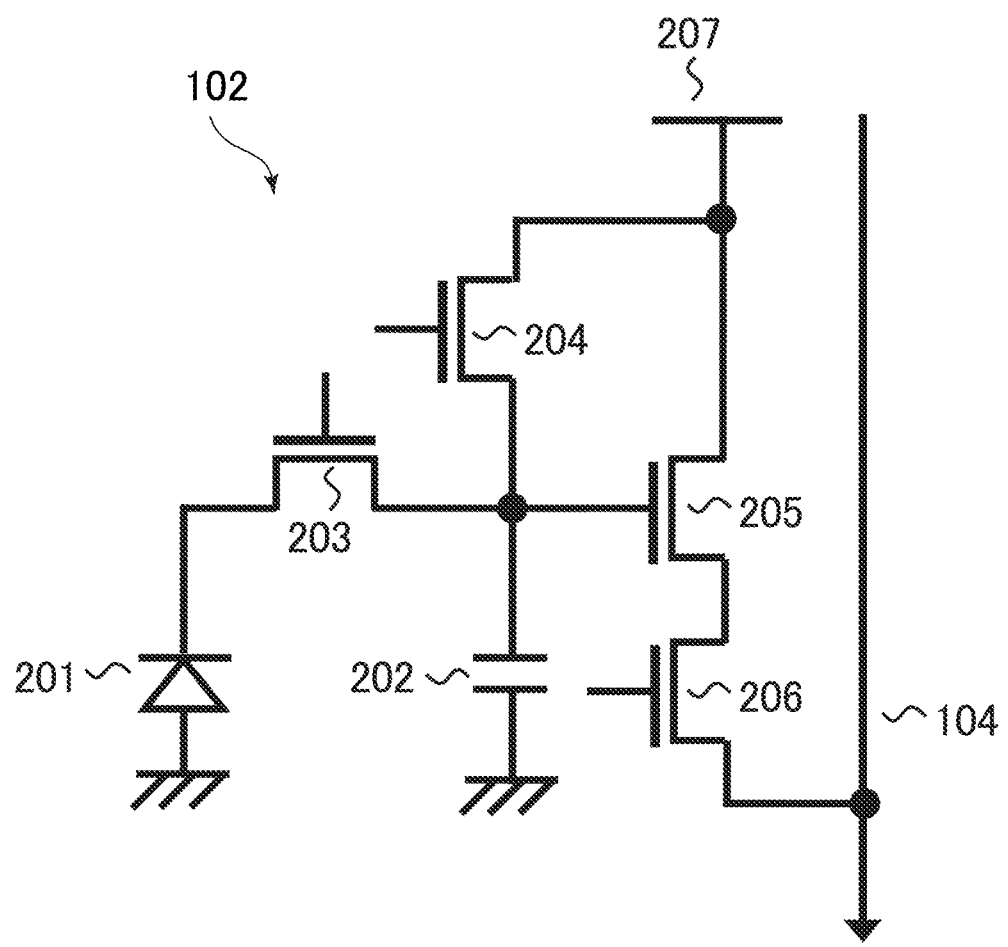
FIG. 2 is a diagram illustrating a configuration of a pixel of the first embodiment.

FIG. 2 is a diagram illustrating a configuration example of the pixel 102 of FIG. 1. The pixel 102 includes a photodiode 201, a floating diffusion capacitance 202, and transistors 203, 204, 205, and 206.

The photodiode 201 is a conversion element directly converting the incident radiation into the electric charge. An anode and cathode of the photodiode 201 are respectively connected to a reference voltage node and a source of the transistor 203. A drain of the transistor 203 is connected to a source of the transistor 204 and a gate of the transistor 205. The drain of the transistor 203, the source of the transistor 204, and the gate of the transistor 205 are a so-called floating diffusion unit. The floating diffusion unit includes a capacitance component (the floating diffusion capacitance 202), and has a function as a carrier holding unit.

Drains of the transistors 204 and 205 are connected to a power supply voltage node 207 to which a power supply voltage is supplied. A source of the transistor 205 is connected to a drain of the transistor 206. A source of the transistor 206 is connected to the vertical signal line 104. The vertical signal line 104 is connected to a current source.

A signal line transmitting a control signal from the vertical scanning circuit 103 (refer to FIG. 1) is connected to each of gates of transistors 203, 204, and 206. Each of the signal lines is a signal line common to a row to which the pixels 102 belong in the pixel array 101.

When the radiation enters the pixel 102, the radiation is converted into the electric charge (signal carrier) by the photodiode 201, and accumulated. The transistor 203 (transfer transistor) transfers the signal carrier accumulated in the photodiode 201 to the floating diffusion unit based on the control signal from the vertical scanning circuit 103. In conjunction with holding the electric charge transferred from the photodiode 201, the floating diffusion unit holds voltage corresponding to an amount of the transferred electric charge by a charge-voltage conversion by the floating diffusion capacitance 202.

The transistor 205 (amplification transistor) amplifies the pixel signal which is based on the electric charge held by the floating diffusion unit, and outputs the amplified signal to the transistor 206. The transistor 206 (selection transistor) outputs the pixel signal from the transistor 205 to the vertical signal line 104 based on the control signal from the vertical scanning circuit 103. The transistor 204 (reset transistor) resets the floating diffusion unit to voltage corresponding to the power supply voltage based on the control signal from the vertical scanning circuit 103. To be noted, it is acceptable to directly connect the photodiode 201 and the floating diffusion capacitance 202 to each other by eliminating the transistor 203.

Figure 3A:
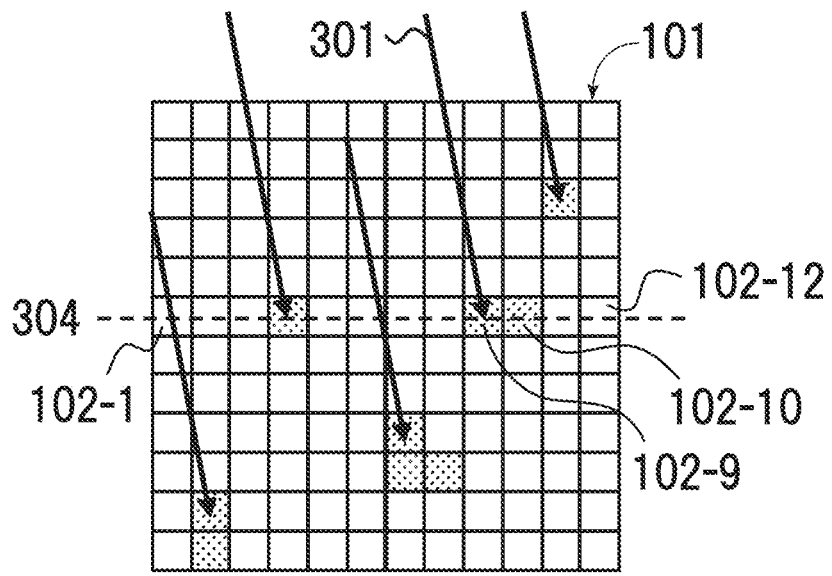
FIGS. 3A to 3C are diagrams illustrating contents of the signal processing of the first embodiment.

FIG. 3A is a schematic diagram illustrating the output of each of the pixels at a time when the pixel array 101 is irradiated with a radiation 301. The pixels 102 which the radiation 301 has entered are marked with a dot pattern, and the pixels 102 which the radiation 301 has not entered are indicated as undotted squares. While, for simplification, the pixel array 101 of 12×12 pixels is illustrated here, it is acceptable to be equipped with a larger number of the pixels 102. As an example of the number of the pixels, for example, approximately thousands×thousands is acceptable. So as to increase resolution, larger number of pixels is desirable. A type of the radiation which can be irradiated includes, for example, the X-ray, the electron beam, and the gamma ray. Depending on the type of the radiation which is irradiated, an appropriate photodiode 201 (conversion element) is used. Alternatively, it is acceptable to dispose a conversion unit such as a fluorescence body.

The frame rate of imaging is, for example, tens to hundreds fps. Equal to or less than 0.5/pix/frm serves as a guide for an irradiation rate of the radiation. In other words, the imaging is performed at a low irradiation rate at which the probability that the radiation enters one pixel at a certain time becomes less than 0.5. Here, the unit (/pix/frm, or per pixel per frame) is an average value (expected value) of the number of particles of the radiation or photons entered per one frame, per one pixel. For example, in a case of using the X-ray, the guide for the irradiation rate is equal to or less than 0.5 as the average number of the photons entered per one frame, per one pixel. In a case of using the electron beam, the guide for the irradiation rate is equal to or less than 0.5 as the average number of the electrons entered per one frame, per one pixel.

To be noted, the irradiation rate of the radiation is more preferably less than 0.5/pix/frm, and, for example, can be reduced to equal to or less than 0.1/pix/frm and, further, equal to or less than 0.05/pix/frm.

Figure 3B:
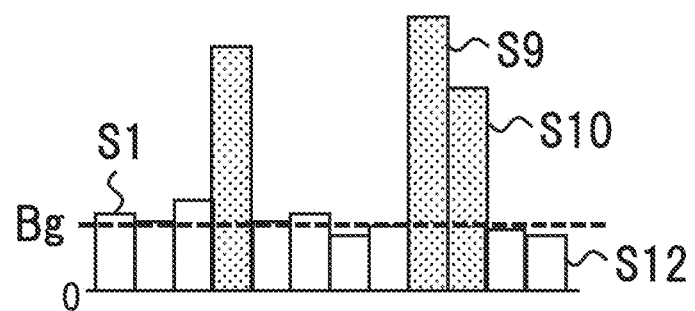

FIG. 3B is a diagram illustrating, by a bar graph, pixel signals S1 to S12 output from pixels 102-1 to 102-12 corresponding to one row of the pixels indicated by a dotted line 304 in FIG. 3A. For example, the output of the pixel 102-9 which the radiation has entered is the pixel signal S9, and the output of the pixel 102-12 which the radiation has not entered is the pixel signal S12.

To be noted, the pixel signal is a signal amount output from the pixel depending on the signal carrier, and varies depending on irradiation conditions such as a type and an acceleration energy of the radiation, a configuration of the photodiode 201, the thickness of a substrate, and the like. It is acceptable that the pixel signal is the digital signal which has been A/D converted by the column circuit 105. Further, in a case where the energy of the radiation is large, since the generated signal amount has a statistical probability distribution, the generated signal amount does not become constant. Further, the irradiated radiation sometimes passes through adjacent pixels and generates the electric charges. In such a case, the pixel signals S9 and S10 corresponding to an entrance of the radiation are sometimes generated across a plurality of adjacent pixels such as the pixels 102-9 and 102-10 in FIG. 3A.

On the other hand, the pixel signal of the pixel (for example, S12) which the radiation has not entered becomes a value equal to the pixel signal which has been read in a state where the radiation is not irradiated. However, the signal value does not become zero, and becomes output on which the dark current generated in the photodiode 201, noises and shading attributable to circuits, and the like are superimposed. A component which is generated regardless of the irradiation and non-irradiation of the radiation is called as a background component. The background component becomes interference at a time of detecting a signal component by the radiation, and leads to the degradation of the image quality of the image data obtained by the radiation detector 1.

A dotted line in FIG. 3B indicates a median of the pixel signals S1 to S12 corresponding to one row of the pixels. Since the irradiation rate of the radiation is lower than 0.5/pix/frm, the median of the pixel signals S1 to S12 can be considered as a signal value equivalent to a value obtained at a time of not emitting the radiation, that is, the background component Bg.

A calculation of the median is, for example, performed by the DFE 108. The DFE 108 performs similar processing on the other rows of the pixel array 101, and calculates the median for each row. Thereby, the DFE 108 can obtain the background component of each of the pixel signals included in one frame image. In other words, the background component obtained by the method of this embodiment is common among a plurality of pixels included in one row. Therefore, the number of the calculated background components is within the number of rows of the pixel array 101 (in a case of a pixel array with n rows and m columns, the number of the calculated background components is n). To be noted, a processing method of this embodiment is also referred to as filter processing (median filter) in which a filter region includes the pixels corresponding to one row.

Figure 3C:
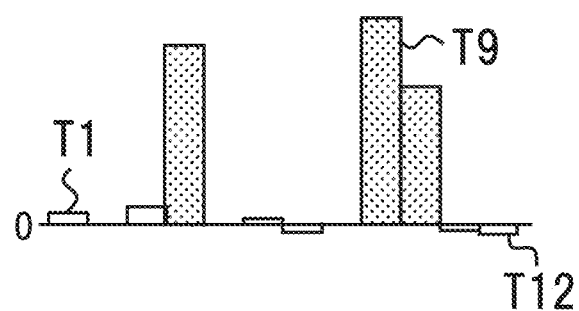

FIG. 3C illustrates pixel signals T1 to T12 (processed pixel signals) obtained by subtracting the background component (median of S1 to S12) from the pixel signals S1 to S12. Since the background component is removed in the pixel signals T1 to T12, which are obtained after subtraction, each of the pixel signals T1 to T12 corresponds to a net signal value generated by the radiation. The DFE 108 can output the image data (corrected data) constituted of the pixel signals obtained by subtracting the background component to the outside of the image sensor 100.

According to this embodiment, the DFE 108, serving as a processing unit, determines the background component contained in the pixel signal read from each of the plurality of pixels 102 for each frame by using values of the pixel signals read from the plurality of pixels 102 in the same frame that includes a pixel whose background component is to be determined. That is, the background component corresponding to a state where the radiation is not irradiated is calculated from the pixel signals obtained during the irradiation of the radiation (during the imaging). Thereby, it is possible to calculate the background component having the synchronicity with the imaging of the imaging objective.

Further, the DFE 108 calculates the corrected data by subtracting the background component from the pixel signals read by the reading circuits, and the radiation detector 1 outputs the corrected data to the outside. Therefore, the radiation detector 1 can provide the data of the background components or the net image data, in which the background components have been removed, to other apparatuses in the radiation imaging system.

Further, by using the radiation detector 1 of this embodiment, it is possible to remove the background component at a time of the imaging without using a calibration method of such as obtaining the background component by obtaining the pixel signals, at a time different from the imaging of the imaging objective, in the state where the radiation is not irradiated. However, the combined use of calibration methods which remove noises other than the background components (noise components) removed by the method of this embodiment is not precluded.

To be noted, the background component varies due to various reasons. For example, damage to the image sensor due accumulated dosage of the radiation, known as a total dose effect, is pointed out. In particular, an increase in the dark current of the image sensor and a threshold shift in the transistor are considered. Alternatively, also in a case where an environmental temperature or a temperature of the image sensor varies, since the dark current of the image sensor varies, the background component varies. According to this embodiment, even in a case where a temporal fluctuation of the background component may become problematic, it is possible to remove the background components having the synchronicity with the imaging and obtain more accurate image data.

Incidentally, while, in this embodiment, the median of pixel signals (S1 to S12 in FIG. 3B) of each row is taken as a value of the background component Bg, it is acceptable to use, as the background component, other statistical values calculated by using the pixel signals in the same frame. For example, in a case where the number of the pixels are large enough, accuracy is sometimes further improved by taking a mode than the median.

Figure 4:
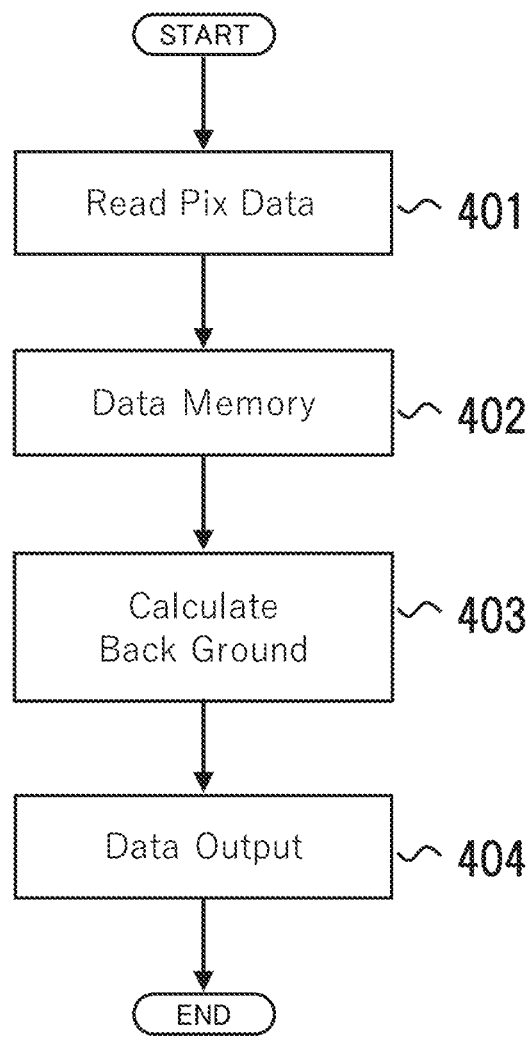
FIG. 4 is a flowchart illustrating signal processing steps of the first embodiment.

FIG. 4 is a flowchart illustrating contents of processing (radiation image processing method, control method of the radiation detector) performed by the radiation detector 1 of this embodiment. At a time of the imaging, the electric charge is accumulated in each of the pixels 102 of the pixel array 101 in a state where the radiation is irradiated from a radiation source of the radiation imaging system at the low irradiation rate, and the pixel signal of each of the pixels 102 is read for each frame at STEP 401. At STEP 402, the read pixel signals are temporarily held. At STEP 403, the background components are calculated by using the pixel signals held at STEP 402. STEPS 402 and 403 correspond to a processing step of processing the pixel signals read at the reading step. At STEP 404, based on the background components calculated at STEP 403, data are output to the outside (outside of the image sensor 100).

At STEP 404, it is acceptable to output original pixel signals and the background components together, or acceptable to output the frame image including the pixel signals obtained by subtracting the background components from the original pixel signals.

In a case of this embodiment, STEP 401 (reading step) is performed by the vertical and horizontal scanning circuits 103 and 107, a control circuit controlling control timing with respect to these scanning circuits, and the like. STEP 402 (holding step), STEP 403 (calculation step), and STEP 404 (output step) are performed by the DFE 108.

As a calculation method of the background component, it is possible to use a known algorithm. For example, in a case where the median of the pixel signals of each row is taken as the background component, it is appropriate that, after sorting the pixel signals of each row in descending order by such as quicksort, an intermediate value in the sorted sequence is selected as the median. Alternatively, it is acceptable to apply a faster algorithm known as median of medians (quickselect). In a case where the mode is taken as the background component, it is appropriate that the mode is identified by preparing a histogram of the pixel signals corresponding to one row of the pixels.

To be noted, in the example described above, the DFE 108 performs STEPS 402 and 403 (holding and calculation steps) in the image sensor 100. That is, according to this embodiment, it is possible to provide functions of performing the calculation and removal of the background component to the image sensor 100 on-chip, that is, on the same substrate on which the pixel array 101, the column circuit 105, and the like are provided. Thereby, it is possible to simplify subsequent processing subsequent to the output signal processing section 109. Further, it is possible to miniaturize the system and a price reduction.

Note that it is acceptable to perform the calculation and removal of the background component by elements, other than the image sensor 100, included in the radiation detector 1. For example, it is acceptable that the output signal processing section 109 performs the processing of STEPS 402 to 404.

It is acceptable to store a program to cause a computer to execute part or the whole of STEPS 401 to 404 in a non-transitory computer-readable storage medium and allows the computer (for example, a computer mounted on the radiation imaging system) to execute the program.

Second Embodiment

A radiation detector of a second embodiment will be described. In this embodiment, the calculation method of the background component is different from the first embodiment. Hereinafter, elements on which reference characters common to the first embodiment are put have substantially the same configurations and functions as the first embodiment, and portions different from the first embodiment will be mainly described.

Figure 5A:
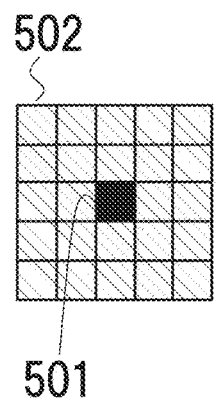
FIGS. 5A to 5C are diagrams for illustrating contents of the signal processing of a second embodiment.
Figure 5B:
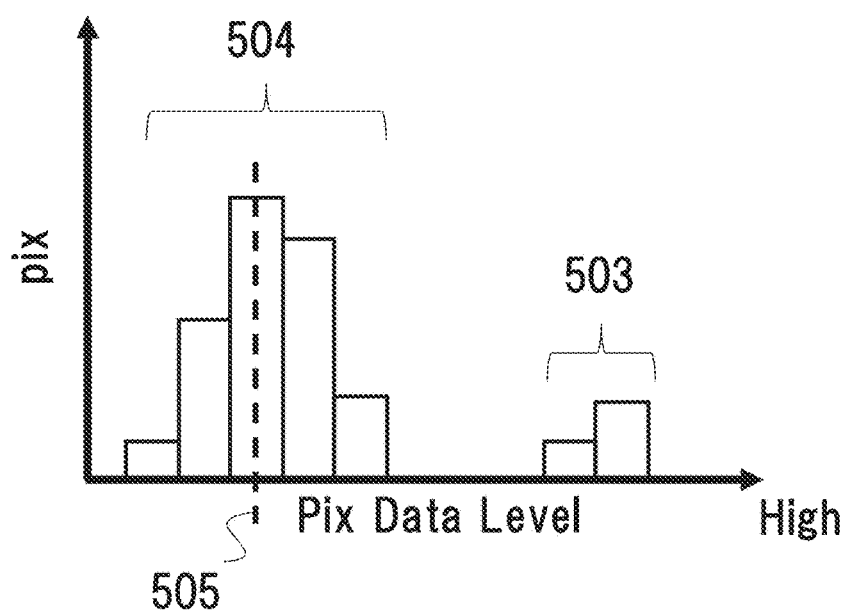
Figure 5C:
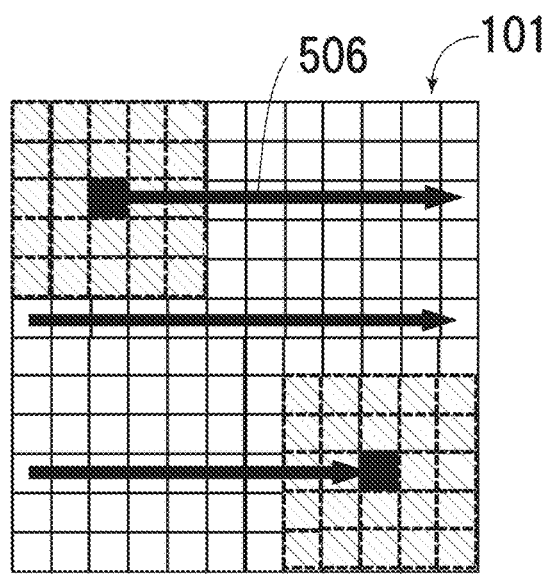

FIGS. 5A to 5C are diagrams illustrating a calculation filter according to the method of this embodiment. FIG. 5A is a diagram illustrating a filter region of the calculation filter. FIG. 5B is a diagram illustrating an example of a histogram representing a value of each of the pixel signals in the region to which the calculation filter is applied.

Since, in the first embodiment, the background components are calculated for each row, one-dimensional background components whose number of elements is equal to the number of rows of the pixel array 101 is obtained. In this embodiment, by calculating the background components for each pixel, two-dimensional background components are obtained.

In particular, with respect to a target pixel 501 (attention pixel) whose background value is desired to be calculated, the size of the calculation filter is a range 502 of a plurality of pixels in which the target pixel 501 is located on a center of the range 502. A median or a mode calculated from values of the pixel signals in the filter region of this calculation filter is referred to as a background component 505 of the target pixel 501.

As illustrated in FIG. 5B, when the histogram representing the values of pixel signals in the filter region is created, the pixel signal 503 which the radiation has entered and the pixel signal 504 which the radiation has not entered are separately distributed in two regions. As with the first embodiment, in the case where the imaging is performed at the low irradiation rate, in general, the number of the pixels which the radiation has not entered is larger than the number of the pixels which the radiation has entered. Therefore, it is possible to use the median or the mode of the pixel signals 503 and 504 as the background component 505.

As illustrated in FIG. 5C, by successively changing and two-dimensionally sweeping a target pixel 506 on the pixel array 101, the background component is calculated for each pixel by the method described above using FIGS. 5A and 5B. While either sweeping in a column direction or a row direction can be performed first, it is preferred that the order of sweeping matches the processing circuits.

To be noted, while, in the example of FIG. 5A, the size of the calculation filter is 5×5 pixels, it is not limited to this size. It is acceptable if the filter size is equal to or more than 3 pixels, and that the filter size is appropriately determined depending on a function of the DFE 108. For example, in a case where a processing function in the DFE 108 works in increments equal to one row, the filter size is set at 1×n (n is equal to or more than 3 and less than the number of the pixels in one row. Alternatively, if the processing by a plurality of rows is possible, it is acceptable that the filter size is set at m×n for which the 5×5 rectangular region described above is one example.

The filter size is set by taking into consideration spatial frequencies of primary elements which generate non-uniformity of the background component. Generally, if the filter size is reduced, it becomes easy to extract localized unevenness and shading components contained in the background component. On the other hand, if the filter size is enlarged, the possibility that a value calculated as the background component will significantly deviate from an actual background component is reduced.

In a case where the filter size becomes a wide range, it is acceptable to perform the calculation described above by separately disposing a circuit block having a memory function, such as a line memory and a frame memory, in the inside or outside of the image sensor. The line memory is a memory capable of storing the pixel signals of the pixels corresponding to one row. The frame memory is a memory capable of storing the pixel signals of the pixels corresponding to one frame (pixel signals corresponding to the number of the pixels of the pixel array 101). In a case where the processing is performed inside of the image sensor, synchronicity between the imaging and a display is improved. Further, since it is possible to perform the processing without increasing the number of components, it is possible to miniaturize the system and reduce the price.

Figure 6A:
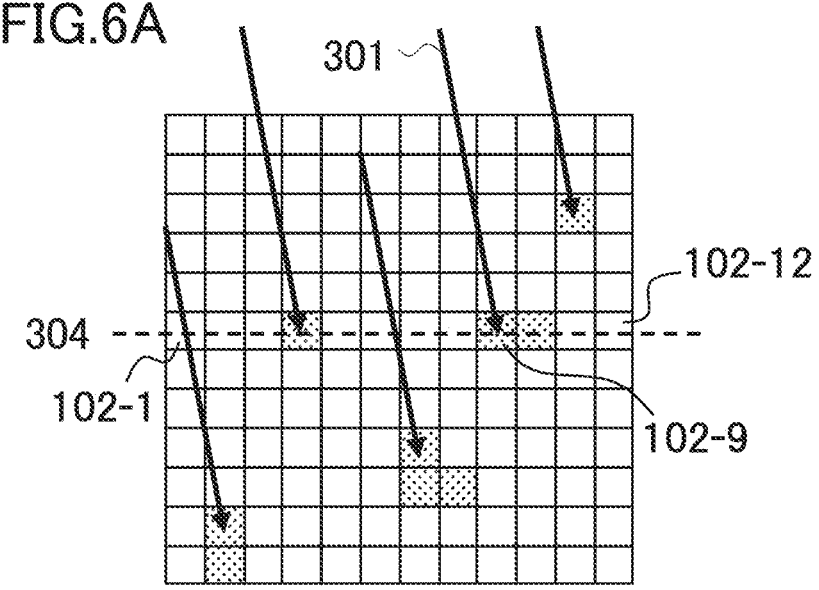
FIGS. 6A to 6D are diagrams for illustrating the contents of the signal processing of the second embodiment.

Using FIGS. 6A to 6D, the calculation method of background component in this embodiment will be described. FIG. 6A is a schematic diagram illustrating the output of each of the pixels 102 at a time when the pixel array 101 is irradiated with the radiation, and FIG. 6A is the same figure as FIG. 3A.

Figure 6B:
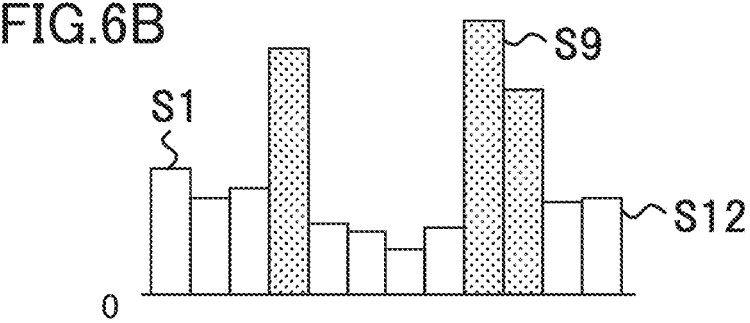

FIG. 6B is a diagram illustrating, by a bar graph, the pixel signals S1 to S12 output from the pixels 102-1 to 102-12 corresponding to one row of the pixels indicated by the dotted line 304 in FIG. 6A. Here, different from FIG. 3B, FIG. 6B illustrates a case where the background component is not constant even in one row and distributed in a recessed shape in the pixel array 101 (that is, the background components of the pixels in a peripheral area are larger than the background components of the pixels in a center area). To be noted, the distribution in the recessed shape is an example for illustrating non-uniformity, and other distributions (for example, shading in a form of a linear function or localized uneven shape) can be assumed.

Figure 6C:
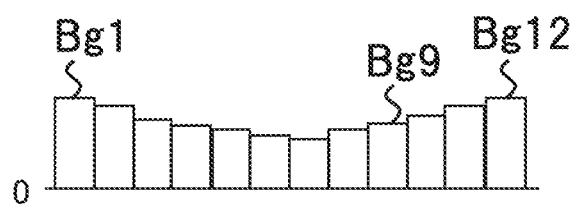

FIG. 6C illustrates background components Bg1 to Bg12 resulting from the filter processing, described by using FIGS. 5A to 5C, of the pixels 102-1 to 102-12 as the target pixels. For example, the background component Bg1 is a median (or a mode) of the pixel signals of the pixels contained in the 5×5 filter region around the pixel 102-1 as a center.

As illustrated in FIG. 6C, in this embodiment, by calculating the background component for each pixel, it is possible to extract the background component having two-dimensional non-uniformity (here, distribution in the recessed shape).

Figure 6D:
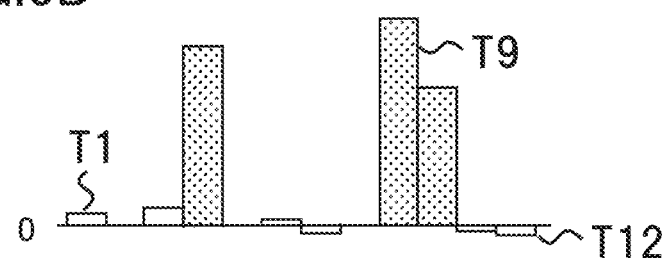

FIG. 6D illustrates pixel signals T1 to T12 obtained by subtracting the background components Bg1 to Bg12 in FIG. 6C from the pixel signals S1 to S12 in FIG. 6B. As illustrated in FIG. 6D, the background components existing in FIG. 6B are removed, including the non-uniformity within a row.

As described above, by calculating the background component of each pixel by performing the processing with the calculation filter, it becomes possible to calculate the background component including a spatially non-uniform distribution. Thereby, it is possible to improve the accuracy of the image data which are obtained after subtracting the background components.

To be noted, the background component includes non-uniformity among the pixels. So as to correct the non-uniformity among the pixels, for example, by storing, as a correcting value, the output of each pixel obtained beforehand in the state where the radiation is not irradiated, and subtracting the correcting value from each of the pixel signals at a time of the imaging can be considered. It is acceptable to combine the calculation method of the background component in this embodiment (and the other embodiments) with the output correction method for each pixel described above.

Third Embodiment

A radiation detector of a third embodiment will be described. In this embodiment, a circuit configuration for reading the pixel signals from the pixel array and a calculation method of the background component is different from the first embodiment. Hereinafter, elements on which reference characters common to the first embodiment are put have substantially the same configurations and functions as the first embodiment, and portions different from the first embodiment will be mainly described.

Figure 7A:
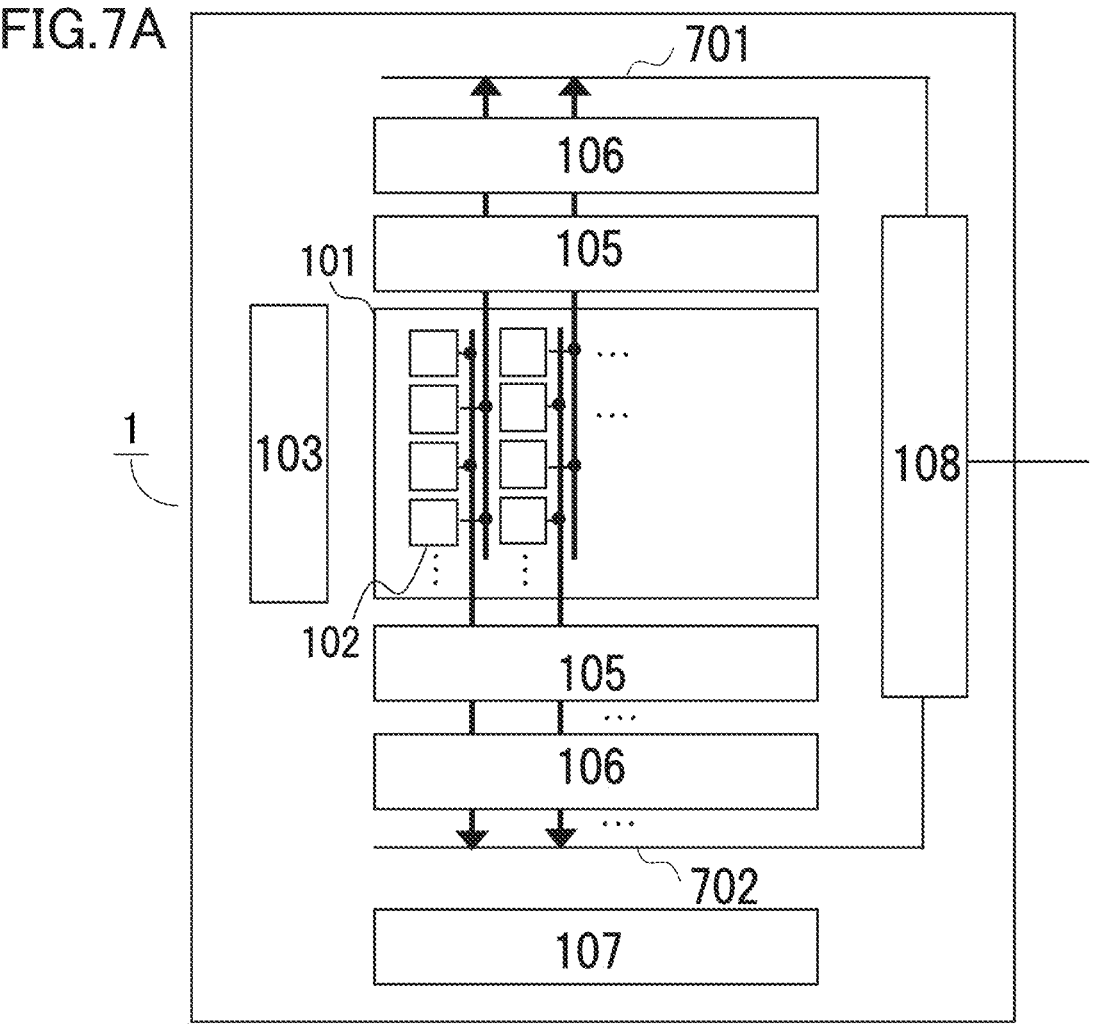
FIG. 7A is a block diagram illustrating a schematic configuration of a radiation detector of a third embodiment.

FIG. 7A is a diagram illustrating a configuration of an image sensor 100 of this embodiment. In this embodiment, differently from the first embodiment (refer to FIG. 1), the pixel signal output from each of the pixels 102 is separately read by upper and lower circuits in FIG. 7A. The image sensor 100 includes first wiring 701 for reading the pixel signals via the column circuit 105 and the column memory 106 in an upper side in FIG. 7A, and second wiring 702 for reading the pixel signals via the column circuit 105 and the column memory 106 in a lower side in FIG. 7A.

The pixels 102 of the pixel array 101 can be separated into a first pixel group whose pixel signals are read via the first wiring 701 (first path) and a second pixel group whose pixel signals are read via the second wiring 702 (second path). That is, the pixel array 101 of this embodiment includes a plurality of pixel groups having different paths for reading the pixel signals.

Figure 7B:
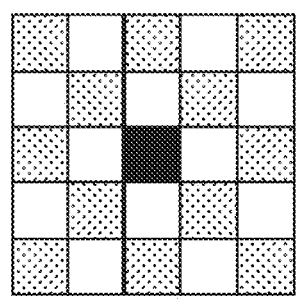
FIG. 7B is a diagram for illustrating contents of the signal processing of the third embodiment.

FIG. 7B is a diagram illustrating a calculation filter of this embodiment. A pixel group 704 includes the pixels whose pixel signals are read via the first wiring 701. A pixel group 705 includes the pixels whose pixel signals are read via the second wiring 702.

The calculation filter of this embodiment calculates the background component of pixel group (here, pixel group 704) which is inside of a predetermined region (in an illustrated example, 5×5 region) and in the same pixel group as the target pixel 703. In other words, in this embodiment, depending on a read path of the pixel signal, the background component of the target pixel is calculated by using the pixel signals of the pixels belonging to the same path as the target pixel. The calculated background component is, for example, a median or a mode.

As described above, by calculating the background component by the read path of the pixel signals, it is possible to effectively correct a change in the background component due to non-uniformity in circuit characteristics of the read paths.

To be noted, while FIGS. 7A and 7B illustrate a configuration example in which the pixel groups 704 and 705 whose read paths are different from each other are disposed in a checkered pattern, it is acceptable that the pixel groups are separated in other arrangements.

Fourth Embodiment

A radiation detector of a fourth embodiment will be described. This embodiment is a variant example of the second embodiment. Hereinafter, elements on which reference characters common to the first and second embodiments are put have substantially the same configurations and functions as the first and second embodiments, and portions different from the second embodiment will be mainly described.

An image sensor 100 of this embodiment includes a pixel array 802 for an arithmetic operation (correcting) disposed around the pixel array 101 used in the imaging. The pixel array 802 for the arithmetic operation is not used for the imaging. That is, the radiation which enters the pixel array 802 is not normally reflected in the image data output by the image sensor 100. It is acceptable that a configuration of a pixel (correcting pixel) included in the pixel array 802 for the arithmetic operation is the same as the pixel 102 for the imaging described by using FIG. 2.

Figure 8:
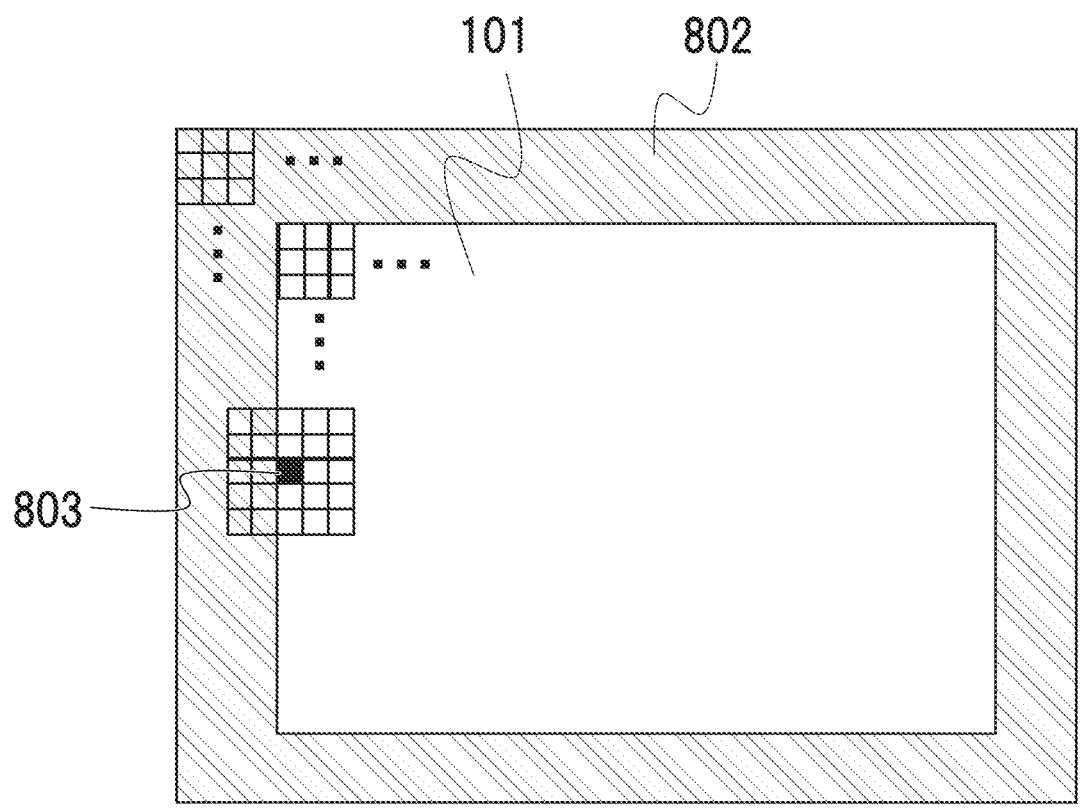
FIG. 8 is a diagram illustrating contents of the signal processing of a fourth embodiment.

In a case where the background component is calculated by the calculation filter of the second embodiment, in a case where the target pixel is a pixel 803 in a peripheral portion of the pixel array 101 for the imaging as illustrated in FIG. 8, the pixel for the arithmetic operation is included in the filter region. In this embodiment, in this case, the background component is calculated by using, in addition to the pixel signals from the pixels of the pixel array 101 for the imaging, the pixel signal of the pixel of the pixel array 802 for the arithmetic operation.

According to this method, it is possible to calculate a highly accurate background component by the filter processing even for the pixel 803 in the peripheral portion of the pixel array 101 for the imaging. Thereby, the image quality of the image in the peripheral portion is further improved after subtracting the background components.

Fifth Embodiment

A radiation detector of a fifth embodiment will be described. This embodiment is a variant example of the second embodiment. Hereinafter, elements on which reference characters common to the first and second embodiments are put have substantially the same configurations and functions as the first and second embodiments, and portions different from the second embodiment will be mainly described.

In this embodiment, a determination method of the filter size is different from the second embodiment. In a case where the radiation is detected by the direct conversion type image sensor 100, phenomena occurring when the filter size is small will be described below.

Figure 9A:
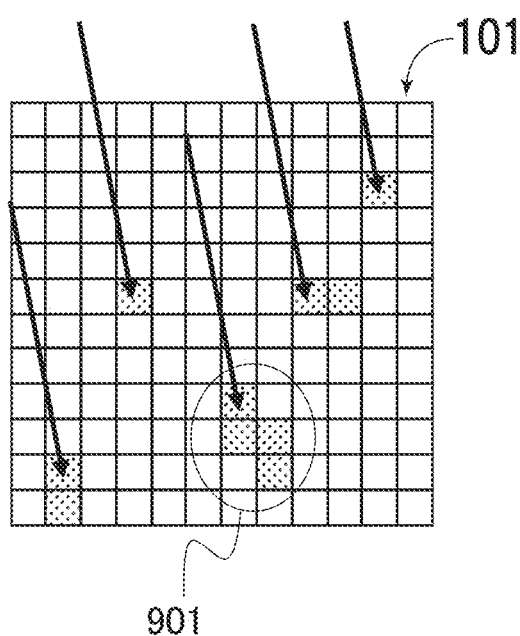
FIGS. 9A to 9E are diagrams for illustrating contents of the signal processing of a fifth embodiment.
Figure 9B:
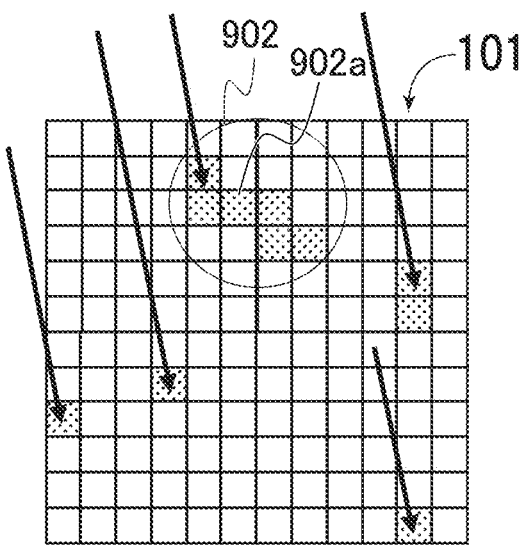
Figure 9C:
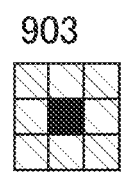
Figure 9D:
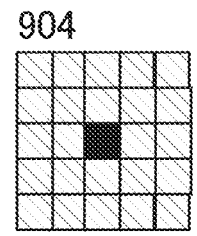
Figure 9E:
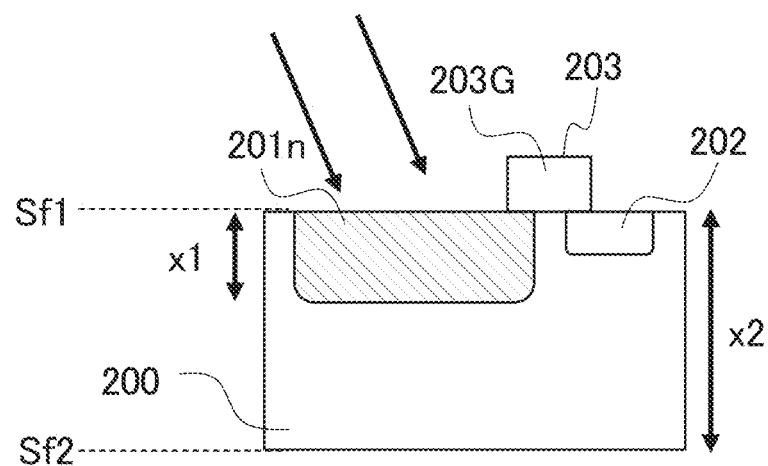

FIGS. 9A to 9E are diagrams for illustrating a calculation method of the background component according to this embodiment. FIGS. 9A and 9B are schematic diagrams illustrating the output of each of the pixels 102 when the pixel array 101 is irradiated with the radiation. FIGS. 9C and 9D are diagrams illustrating calculation filters. FIG. 9E is a diagram illustrating a section structure of the pixel 102.

As described in the first embodiment, when one radiation (one photon or one particle) enters the pixel, the signal carriers are sometimes generated across the plurality of adjacent pixels. This is called as a cluster, the number of the pixels in one cluster is referred to as a cluster size A. In other words, in a binarized image which represents the pixels of the pixel array in a binary manner depending on whether or not the radiation has entered, the cluster is a connected component (for example, 4-connected component or 8-connected component) including the pixels (black dots in FIGS. 9A and 9B) which the radiation has entered. Further, a maximum value of the cluster size A in one frame image is referred to as Amax.

In a case where, as with the second embodiment, the background component is calculated by using the calculation filter which includes the target pixel and its adjacent pixels, if the filter size of the calculation filter is equal to or more than (2×Amax+1), it is possible to stably calculate the background component. On the other hand, in a case where the filter size is less than (2×Amax+1), there is a possibility that a cluster which exceeds the filter size may be included within one frame image. In this case, if the calculation filter is applied to a region including the cluster, a value of pixel signal of the pixel which the radiation has entered becomes a median or a mode, and there is a possibility that a value calculated as the background component may not be appropriate.

For example, in a case of FIG. 9A, the maximum value of the cluster size A is 4 (Amax=4) which is the cluster size illustrated in a region 901. In this case, if the filter size is equal to or more than 9 (=2×4+1), it is possible to calculate an appropriate background component for each pixel. For example, it is possible to use the calculation filter 903 of 3×3 pixels illustrated in FIG. 9C.

On the other hand, in a case of FIG. 9B, the maximum value of the cluster size A is 6 (Amax=6) which is the cluster size illustrated in a region 902. In this case, there is a possibility that it may not be possible to calculate the appropriate background component by the calculation filter of 3×3 pixels illustrated in FIG. 9C. For example, in a case where the calculation filter of 3×3 pixels is applied to a pixel 902a in FIG. 9B as the target pixel, the pixels of the cluster become a majority in the filter region, and the pixel signal of the pixel which the radiation has entered becomes the background component.

In a case of FIG. 9B, if the filter size is equal to or more than 13 (=2×6+1), it is possible to calculate the appropriate background component. For example, it is possible to use the calculation filter 904 of 5×5 pixels illustrated in FIG. 9D. To be noted, since it is satisfactory if the filter size is equal to or more than 13, sizes such as 7×2 and 5×3 are acceptable.

Depending on the irradiation conditions of the radiation, a value of the Amax can vary for each frame. Therefore, by calculating the value of the Amax for each frame, it is possible to vary the filter size. For example, by separating all the pixel signals included in one frame image into output from the pixels which the radiation has entered and output from the pixels which the radiation has not entered, the connected component of the pixels which the radiation has entered is treated as the cluster. The background component of each pixel in a preceding frame (or its average value) is, for example, used as a threshold value for distinguishing between the output from the pixels which the radiation has entered and the output from the pixels which the radiation has not entered. A maximum size of all of the clusters included in one frame image becomes the Amax.

Then, by using the Amax calculated in the preceding frame, the filter size in a succeeding frame is determined. That is, in this embodiment, the size of the filter region used for the filter processing is varied for each frame.

When the pixel signals of the succeeding frame have been read, based on the determined filter size, the background component of the pixel signal of each of the pixels is calculated using the pixel signals of the succeeding frame. That is, in this embodiment, while the information of the preceding frame to the current frame is fed back, it is common to the other embodiments that the background component is calculated by using the pixel signals of the same frame that includes the target pixel signal whose background component is to be determined.

To be noted, assuming the sudden enlargement of the Amax due to any irregularities during the imaging, it is acceptable to impose an upper limit on the filter size beforehand. By imposing the upper limit, it is possible to avoid an extreme increase in a processing load of the DFE 108 due to a sudden increase in the filter size.

According to this embodiment, even in a case where one radiation generates the signal charges across the plurality of pixels, it is possible to calculate the appropriate background component for each pixel.

Variant Example 1

In the description above, the method of determining the Amax for each frame is illustrated as an example. As a variant example 1, it is acceptable to fix the filter size at a predetermined size by estimating the maximum value Amax of the cluster size based on the structure of the image sensor 100.

FIG. 9E is a diagram illustrating part of a section structure of a sensor. FIG. 9E illustrates a cross section which corresponds to the photodiode 201, the floating diffusion capacitance 202, and the transistor 203 of FIG. 2. Here, FIG. 9E illustrates a case in which a portion generating the signal carrier is a negative (N) type and the transistor 203 is a negative-positive-negative (NPN) type. In the inside of a semiconductor substrate 200, an N type semiconductor region 201n included in an electric charge accumulation region of the photodiode 201 and an N type semiconductor region included in the floating diffusion capacitance 202 are disposed. On the semiconductor substrate 200, a gate electrode 203G of the transistor 203 is disposed via a gate insulating film.

A surface of the semiconductor substrate 200 is referred to as Sf1, and a back surface of the semiconductor substrate 200 is referred to as Sf2. A distance from the surface Sf1 of the semiconductor substrate 200 to the back surface Sf2, that is, the thickness of the semiconductor substrate 200 is referred to as x2. The thickness of a sensitive layer capable of detecting the radiation is referred to as x1. The thickness x1 is a distance from the surface Sf1 to a lower surface of a semiconductor region 201n in a thickness direction of the substrate. The lower surface of the semiconductor region 201n is a boundary with a positive (P) type semiconductor region which forms a positive-negative (PN) connection to the semiconductor region 201n Here, while the sensitive layer capable of detecting the radiation can substantially include a depletion layer formed by the semiconductor region 201n and the P type semiconductor region, for simplification, the thickness of the sensitive layer is assumed to be the thickness x1 of the semiconductor region 201n.

Factors determining the cluster size include the energy of an irradiated radiation, the thickness x1 of the sensitive layer of the photodiode, the thickness x2 of the semiconductor substrate 200, and a pixel pitch. In a case where silicon is used as a material of the photodiode, it is common that the thickness x1 of the sensitive layer is several micrometers (μm) to several tens of μm, and that the thickness x2 of the semiconductor substrate is several tens of μm to several hundreds of μm. Based on a premise that an entered radiation passes through the sensitive layer, it is possible to estimate the Amax by the following equation. Here, the pixel pitch is an arrangement interval of the pixels in the pixel array, and means a distance from a reference point (for example, a center of the sensitive layer) of one pixel to the reference point of a pixel adjacent to the one pixel. In a case where arrangement intervals of the pixels in the vertical and horizontal directions are different from each other, the average value is used as the pixel pitch. Further, in a case where the right side of the following equation becomes non-integer, a number is rounded off to an integer.

$A\max = 3.5 \times x1 (\mu m)/\text{pixel pitch} (\mu m)$

Using the Amax above, by setting the filter size at $(2 \times A\max + 1)$, even in the case where one radiation generates the signal carriers across the plurality of pixels, it is possible to calculate the appropriate background component for each pixel.

To be noted, in a case of fixing the filter size beforehand by estimating the Amax, a value of the Amax (or filter size) is stored in a non-volatile memory area included in the image sensor, and used for the calculation by the DFE 108. Further, if the filter size is at least equal to or more than $(2 \times A\max + 1)$ with respect to the Amax determined by the equation above, it is acceptable to use a filter size determined by other methods.

Variant Example 2

As the other method to estimate the Amax, the use of a statistical value of the cluster size in the frame image obtained in the same conditions as during the imaging is considered. For example, the frame image is obtained in conditions where the output of the radiation source is adjusted such that the irradiation rate becomes the same as during the imaging, and, then, the distribution of the cluster size is calculated from the frame image. An average value and the standard deviation of the cluster size are respectively referred to as Aave and Aσ. In this case, it is acceptable to determine the Amax by an equation below.

$A\max = A\text{ave} + A\sigma$

Thereby, even in the case where one radiation generates the signal carriers across the plurality of pixels, it is possible to calculate the appropriate background component for each pixel. To be noted, if the filter size is at least equal to or more than $(2 \times A\max + 1)$ with respect to the Amax determined by the equation above, it is acceptable to use a filter size determined by other methods.

Sixth Embodiment

A radiation detector of a sixth embodiment will be described. This embodiment is an example of the radiation detector using a compound semiconductor such as cadmium telluride (CdTe) or cadmium zinc telluride (CdZnTe) as the photodiode. Hereinafter, elements on which reference characters common to the first embodiment are put have substantially the same configurations and functions as the first embodiment, and portions different from the first embodiment will be mainly described.

In a case where CdTe or CdZnTe is used as the photodiode, a signal reading circuit portion includes such as a complementally metal oxide semiconductor transistor (CMOS transistor) manufactured separately, and the radiation detector is prepared by joining the photodiode to circuit portions using such as solder.

Figure 10:
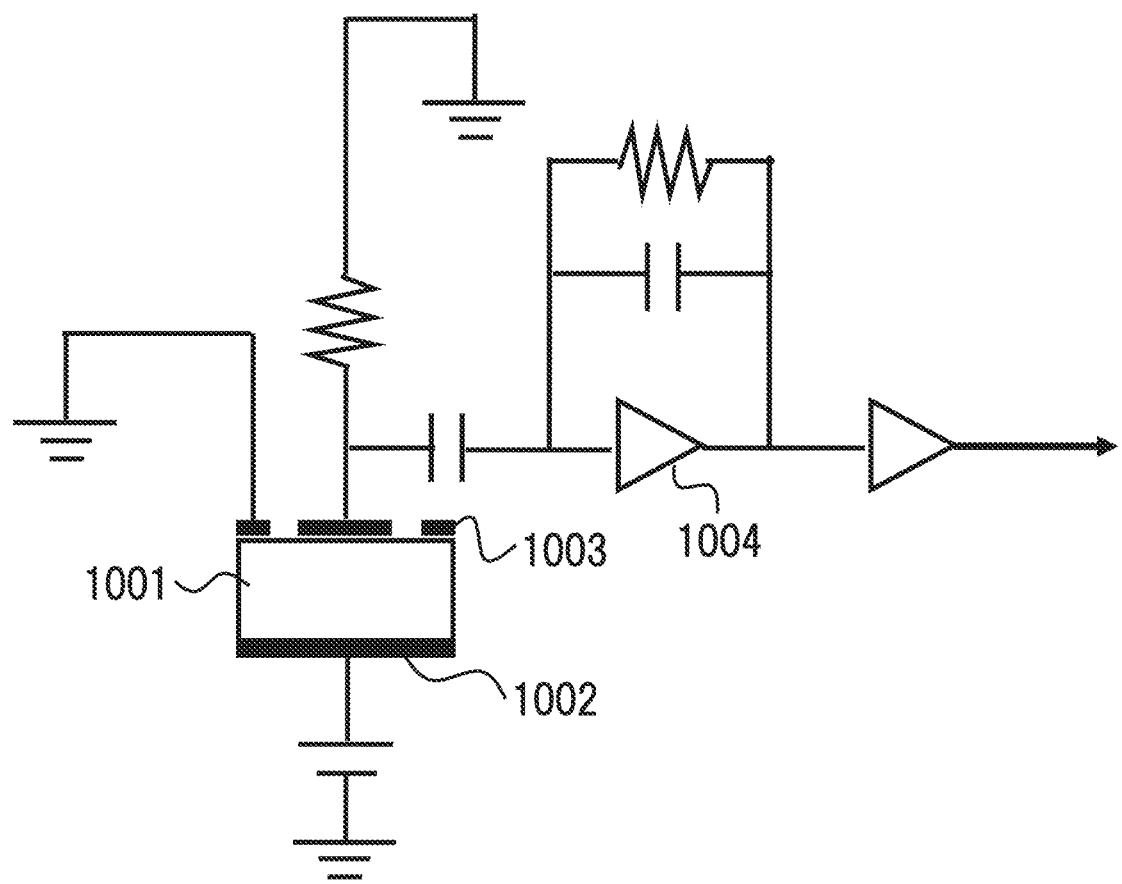
FIG. 10 is a diagram illustrating a configuration of a pixel of a sixth embodiment.

FIG. 10 is a diagram illustrating a configuration example of a pixel 102 (refer to FIG. 1) in this embodiment. The pixel 102 includes a photodiode 1001 including the compound semiconductor, positive and negative electrodes 1002 and 1003 applying voltage to the photodiode 1001, and an amplification circuit 1004 amplifying a signal generated by the photodiode 1001. A two-dimensional pixel array 101 is formed by patterning the negative electrode 1003. To be noted, while, with this configuration, a hole is treated as a signal carrier, depending on a material of an electrode, it is acceptable to use an electron as the signal carrier, and a configuration of the circuit is not limited to this.

With respect to a configuration of a signal processing unit and a method of the signal processing, it is possible to use a configuration and method similar to each of the embodiments described above. As described above, even in the case where the compound semiconductor such as CdTe or CdZnTe is used as the photodiode, by calculating the background component using the pixel signals of each frame read from the pixel array 101, it is possible to obtain the same effects that are brought onto each of the embodiments described above.

Seventh Embodiment

As a seventh embodiment, the radiation imaging system into which the radiation detector is incorporated will be described using FIG. 11.

Figure 11:
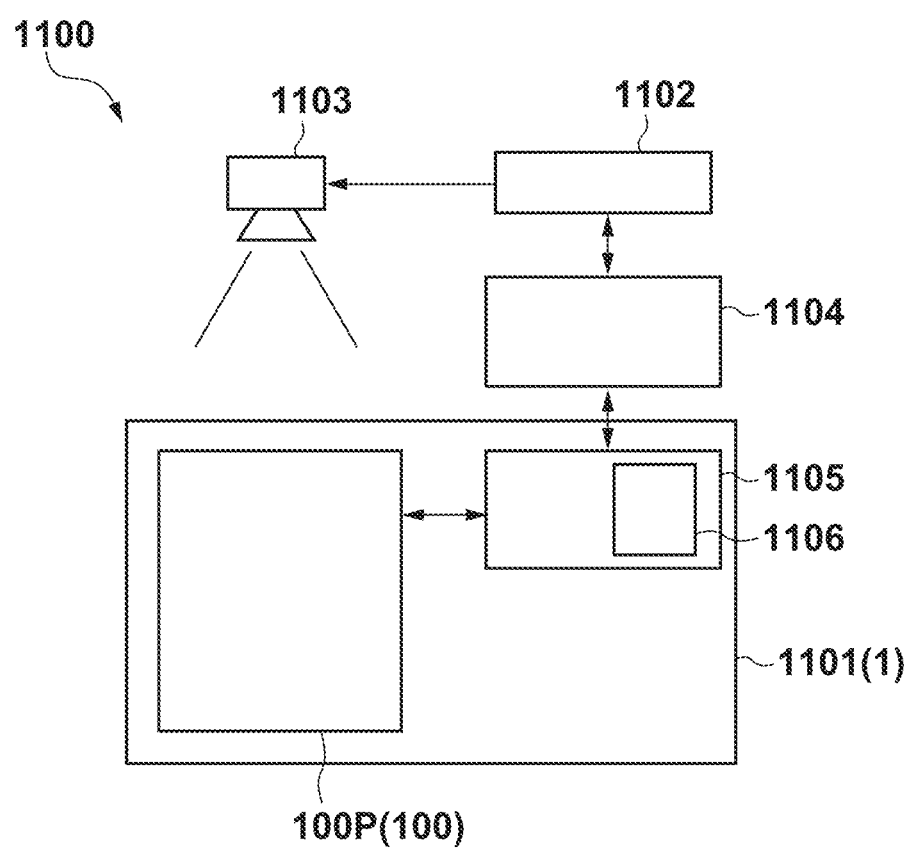
FIG. 11 is a diagram illustrating a radiation imaging system of a seventh embodiment.

The radiation imaging system 1100 illustrated in FIG. 11 includes a radiation imaging apparatus 1101, serving as a radiation detector 1, an irradiation control unit 1102, a radiation source 1103, and a computer 1104. The radiation detector 1 includes an imaging panel 100P, serving as a direct conversion type image sensor 100. It is possible to use the same radiation detector 1 and image sensor 100 that are described in the first to sixth embodiments.

The radiation source 1103 starts emitting the radiation in accordance with an irradiation instruction from the irradiation control unit 1102. The radiation emitted from the radiation source 1103 transmits the imaging objective (test object), and enters the image sensor 100 of the radiation imaging apparatus 1101. The radiation source 1103 stops to emit the radiation in accordance with a stop instruction from the irradiation control unit 1102.

The radiation imaging apparatus 1101 is, for example, a flat panel detector used for radiographing in such as a medical image diagnosis or a non-destructive inspection. It is possible to form the imaging panel 100P of the radiation imaging apparatus 1101 into a plate shape in a size matching the size of the imaging objective. For example, in the image sensor 100, 3300×2800 pixels are disposed with respect to a 550 millimeters (mm)×445 mm substrate.

The radiation imaging apparatus 1101 includes the imaging panel 100P described above, a control unit 1105 for controlling the imaging panel 100P, and a signal processing unit 1106 for processing a signal output from the imaging panel 100P. It is acceptable that the signal processing unit 1106 obtains the background components of the pixel signals output from the imaging panel 100P by the method of each of the embodiments described above and performs the processing of subtracting the background components from the pixel signals. Further, it is acceptable that the signal processing unit 1106, for example, A/D converts the signals output from the imaging panel 100P and outputs the signals to the computer 1104 as digital image data. Further, it is acceptable that the signal processing unit 1106, for example, based on a signal output from the imaging panel 100P, generates a stop signal so as to stop the irradiation of the radiation from the radiation source 1103. The stop signal is supplied to the irradiation control unit 1102 via the computer 1104, and the irradiation control unit 1102 sends the stop instruction to the radiation source 1103 in response to the stop signal.

It is possible to configure the control unit 1105 so as to include, for example, a programmable logic device (PLD) such as a field programmable gate array (FPGA), an application specific integrated circuit (ASIC), a general purpose computer into which a program is incorporated, or a combination of all or part of these.

While, in this embodiment, the signal processing unit 1106 is illustrated as being disposed inside of the control unit 1105 or as being part of functions of the control unit 1105, it is not limited to this. It is acceptable that the control unit 1105 and the signal processing unit 1106 are configured separately from each other. Further, it is acceptable to dispose the signal processing unit 1106 separately from the radiation imaging apparatus 1101. For example, it is acceptable that the computer 1104 includes functions of the signal processing unit 1106. Therefore, it is possible to include the signal processing unit 1106 into the radiation imaging system 1100 as a signal processing unit for processing signals output from the radiation imaging apparatus 1101.

The computer 1104 is capable of controlling the radiation imaging apparatus 1101 and the irradiation control unit 1102, and performing the processing of receiving radiation image data from the radiation imaging apparatus 1101 and displaying the received data as a radiation image. Further, the computer 1104 can also act as an input portion into which a user inputs conditions for performing the imaging of the radiation image.

As an example, the irradiation control unit 1102 includes an irradiation switch, and, when the user turns on the irradiation switch, besides sending the irradiation instruction to the radiation source 1103, sends start notification notifying a start of the irradiation of the radiation to the computer 1104. In response to the start notification, the computer 1104 which has received the start notification notifies the start of the irradiation of the radiation to the control unit 1105 of the radiation imaging apparatus 1101. In response to this, the control unit 1105 generates a signal in the imaging panel 100P corresponding to the incident radiation.

Eighth Embodiment

As an eighth embodiment, the other example of the radiation imaging system into which the radiation detector is incorporated will be described using FIGS. 12A and 12B.

Figure 12A:
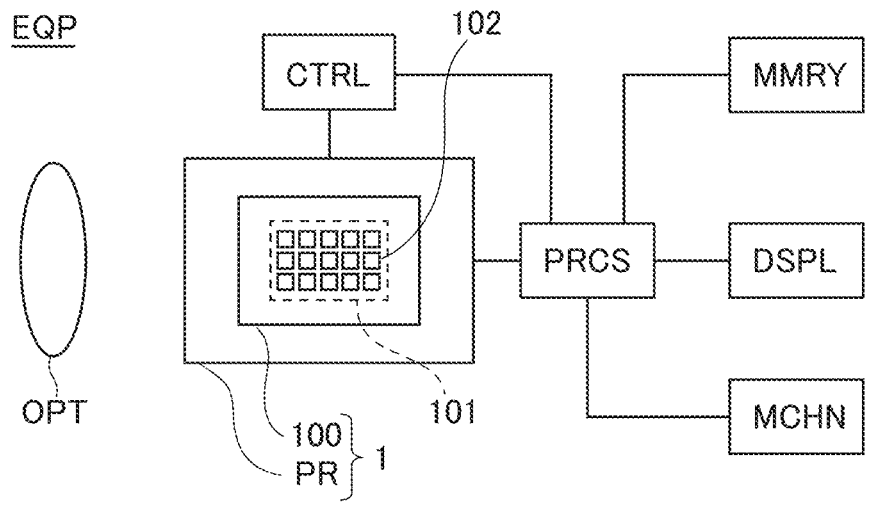
FIGS. 12A and 12B are diagrams illustrating a radiation imaging system of an eighth embodiment.

FIG. 12A illustrates equipment EQU, serving as a radiation imaging system equipped with the radiation detector 1. Besides the image sensor 100 which is a semiconductor device, the radiation detector 1 includes a package PKG for mounting the image sensor 100.

The package PKG may include a substrate onto which the image sensor 100 is secured, a cover body, made of such as glass, facing the image sensor 100, and a connection member, such as a bonding wire and a bump, connecting terminals disposed on the substrate and the image sensor 100 to each other.

The image sensor 100 includes the pixel array 101, in which the pixels 102 are disposed in a matrix, and a peripheral region PR around the pixel array 101. In the peripheral region PR, it is possible to dispose peripheral circuits (for example, the vertical scanning circuit 103 and the DFE 108).

The equipment EQP can further include at least any of an optical system OPT, a control unit CTRL, a processing apparatus PRCS, a display apparatus DSPL, a memory unit MMRY, and a mechanical apparatus MCHN. The optical system OPT forms the image of the radiation on the radiation detector 1, and is, for example, a lens, a shutter, and a mirror. Depending on a type of the radiation to be handled, it is acceptable that the optical system OPT forms the image of, for example, the corpuscular ray, such as the electron or proton beam, on the radiation detector 1. The control unit CTRL controls the radiation detector 1, and is, for example, the ASIC. The processing apparatus PRCS processes a signal output from the radiation detector 1, and is an apparatus such as a central processing unit (CPU) or the ASIC so as to constitute an analog front end (AFE) or the digital front end (DFE). The display apparatus DSPL is an electroluminescence (EL) display apparatus or a liquid crystal display apparatus displaying information obtained by the radiation detector 1 in a form of such as a visible image. The memory unit MMRY is a magnetic device or a semiconductor device storing information obtained by the radiation detector 1. The memory unit MMRY is a volatile memory such as a static random access memory (SRAM) or a dynamic random access memory (DRAM), or a non-volatile memory such as a flash memory or a hard disk drive. The mechanical apparatus MCHN includes a moving unit or a driving unit such as a motor or an engine.

The equipment EQP displays the signal output from the radiation detector 1 in the display apparatus DSPL, and sends the signal to the outside by a communication device, not shown, equipped in the equipment EQP. Therefore, apart from a memory circuit and an arithmetic circuit included in the radiation detector 1, the equipment EQP, is preferably further equipped with the memory unit MMRY and the mechanical apparatus MCHN. It is acceptable that the mechanical apparatus MCHN is controlled based on the signal output from the radiation detector 1.

It is acceptable that the equipment EQP illustrated in FIG. 12A is medical equipment such as an endoscope or a radiation diagnostic device, measuring equipment such as a proximity sensor, or analytical equipment such as an electron microscope.

Figure 12B:
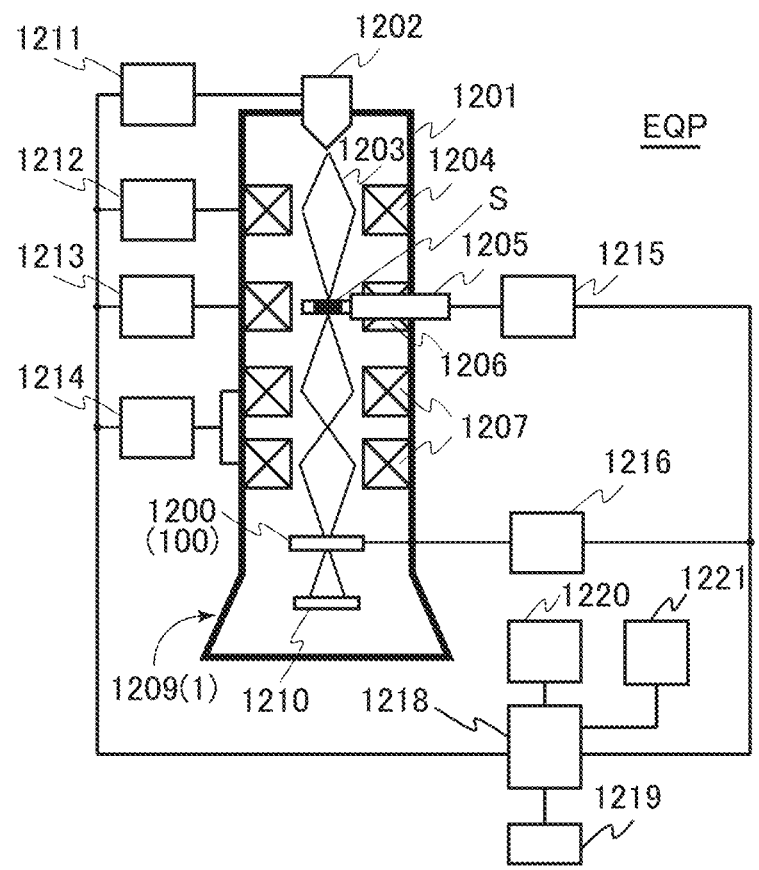

FIG. 12B is a schematic diagram illustrating, as an example of the equipment EQP, a configuration of a transmission electron microscope (TEM). The equipment EQP as the electron microscope includes an electron beam source 1202 (electron gun), an irradiation lens 1204, a vacuum chamber 1201 (lens barrel), an objective lens 1206, an enlargement lens system 1207, and a camera 1209, serving as the radiation detector 1.

An electron beam 1203 which is an energy beam emitted from the electron beam source 1202 is focused by the irradiation lens 1204, and irradiated to a sample S, serving as an analyte, held by a sample holder. The space through which the electron beam 1203 passes is formed by the vacuum chamber 1201 (lens barrel), and this space is kept in a vacuum state. The radiation detector 1 is disposed so as to face the vacuum space through which the electron beam 1203 passes. The electron beam 1203 transmitted through the sample S is enlarged by the objective lens 1206 and the enlargement lens system 1207, and projected onto the radiation director 1. An electron optical system for irradiating the sample S with the electron beam is referred to as an irradiation optical system, and the electron optical system for forming the image of the electron beam transmitted through the sample S is referred to as an imaging optical system.

The electron beam source 1202 is controlled by an electron beam source control apparatus 1211. The irradiation lens 1204 is controlled by an irradiation lens control apparatus 1212. The objective lens 1206 is controlled by an objective lens control apparatus 1213. The enlargement lens system 1207 is controlled by an enlargement lens system control apparatus 1214. A sample holder control apparatus 1205 is controlled by a holder control apparatus 1215 controlling a drive mechanism of the sample holder.

The electron beam 1203 transmitted through the sample S is detected by a direct electron detector 1200 of the camera 1209. An output signal from the direct electron detector 1200 is processed by a signal processing apparatus 1216 and an image processing apparatus 1218, both serving as the processing apparatus PRCS, and the image signal is generated. The generated image signal (transmission electron image) is displayed in an image display monitor 1220 and an analysis monitor 1221, both corresponding to the display apparatus DSPL.

The camera 1209 is disposed in a lower part of the equipment EQP. The camera 1209 includes the direct electron detector 1200. The direct electron detector 1200 corresponds to the image sensor 100. At least part of the camera 1209 is disposed so as to expose to the vacuum space formed by the vacuum chamber 1201.

Each of the electron beam source control apparatus 1211, the irradiation lens control apparatus 1212, the objective lens control apparatus 1213, the enlargement lens system control apparatus 1214, and the holder control apparatus 1215 is connected to the image processing apparatus 1218. Thereby, it is possible to exchange data each other so as to set imaging conditions of the electron microscope. For example, it is possible to set an irradiation rate of the electron beam so that the rate will become equal to or less than 0.5 electron/pix/frm. In this case, the electron beam source control apparatus 1211 and the image processing apparatus 1218 act as a control unit controlling the irradiation rate of the radiation. It is possible to set the drive control of the sample holder and observation conditions of each lens by a signal from the image processing apparatus 1218.

An operator prepares the sample S which becomes the imaging objective, and set the imaging conditions by using an input apparatus 1219 connected to the image processing apparatus 1218. Predetermined data are input into each of the electron beam source control apparatus 1211, the irradiation lens control apparatus 1212, the objective lens control apparatus 1213, and the enlargement lens system control apparatus 1214 so as to obtain a desired acceleration voltage, magnification, and an observation mode. Further, the operator inputs conditions such as the number of images of a continuous field of view, a starting position of the imaging, and a moving speed of the sample holder into the image processing apparatus 1218 using the input apparatus 1219 such as a mouse, a keyboard, and a touch panel. It is acceptable to set specifications such that, irrespective of input by the operator, the image processing apparatus 1218 automatically sets the conditions.

The radiation imaging system described in the seventh and eighth embodiments above are mere examples, and it is acceptable to apply the radiation detector described in the first to sixth embodiments to other systems.

Further, in the above embodiments, examples in which the methods of calculating the background components of the pixel signals at the same time as the imaging are applied to the radiation detector or the radiation imaging system are described. It is not limited to this, and, for example, it is acceptable to apply the method described in each of the embodiments to a detector using a single photon avalanche diode (SPAD) or an imaging system equipped with this. Thereby, it is possible to determine the background component having the synchronicity with the imaging and remove the background component from the image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070670, filed on Apr. 22, 2022, and Japanese Patent Application No. 2023-020419, filed on Feb. 14, 2023, which are hereby incorporated by reference herein in their entirety.

What is claimed is:

1. A radiation detector comprising:
   a plurality of pixels configured to directly convert a radiation into an electric charge;
   a reading circuit configured to read pixel signals from the plurality of pixels frame by frame; and
   a processing unit configured to process the pixel signals read by the reading circuit,
   wherein, for each of the plurality of pixels as a target pixel, the processing unit is configured to determine a background component contained in a pixel signal of the target pixel (i) by using values of the pixel signals read from the plurality of pixels in a frame in which the pixel signal of the target pixel is read and (ii) by performing filter processing on pixel signals of pixels in a predetermined filter region including the target pixel, and
   wherein, in the filter processing, the processing unit is configured to determine a median of the pixel signals of the pixels in the filter region as a value of the background component for the target pixel in the frame.

2. The radiation detector according to claim 1, wherein the processing unit is configured to calculate a corrected datum in which the background component is subtracted from the pixel signal read by the reading circuit, and
   wherein the radiation detector is configured to output the corrected datum to an outside.

3. The radiation detector according to claim 1, wherein the processing unit is provided on a substrate on which the plurality of pixels and the reading circuit are provided.

4. The radiation detector according to claim 1, wherein the plurality of pixels are arranged in a matrix, and
   wherein the filter region is a rectangular region within the matrix, on a center of which the target pixel is located.

5. The radiation detector according to claim 1, wherein the plurality of pixels are arranged in a matrix, and
   wherein the filter region is one row within the matrix that includes the target pixel.

6. The radiation detector according to claim 5, further comprising a line memory configured to store pixel signals read from one row of pixels in the plurality of pixels, and
   wherein the processing unit is configured to determine the background component for each row by using the pixel signals stored in the line memory.

7. The radiation detector according to claim 1, wherein the processing unit is configured to vary a size of the filter region for each frame such that a number of pixels included in the filter region is equal to or more than $(2 \times A_{max}+1)$, where the $A_{max}$ is a maximum number of pixels in which an electric charge is generated by one photon or one particle of the radiation.

8. The radiation detector according to claim 7, wherein, in a case where a value of the $A_{max}$ of each frame exceeds a predetermined upper limit, the processing unit is configured to determine the size of the filter region in the filter using the predetermined upper limit instead of the $A_{max}$.

9. The radiation detector according to claim 1, wherein, in a case where a thickness of a sensitive layer capable of detecting the radiation is x1, a size of the filter region is preset at a value equal to or more than $(2 \times A_{max}+1)$, where the $A_{max}$ satisfies an equation below with respect to the x1 and a pixel pitch of the plurality of pixels:

$$A_{max}=3.5 \times x1 \text{ (μm)/pixel pitch (μm)}.$$

10. The radiation detector according to claim 1, wherein in a case where an average of and a standard deviation of the number of the pixels in which the electric charge is generated by one photon or one particle of the radiation are respectively $A_{ave}$ and $A\sigma$,
    a size of the filter region is preset at a value equal to or more than $(2 \times A_{max}+1)$, where the $A_{max}$ satisfies an equation below:

$$A_{max}=A_{ave}+A\sigma.$$

11. The radiation detector according to claim 1, further comprising correcting pixels which are disposed around the plurality of pixels and from which pixel signals for correction are read by the reading circuit, the correcting pixels being configured such that the pixel signals of the correcting pixels are not included in image data output by the radiation detector,
    wherein, in a case of performing the filter processing on a pixel in a peripheral portion of the plurality of pixels, the processing unit is configured to determine the background component by using a pixel signal of a correcting pixel of the correcting pixels which is positioned within the filter region.

12. The radiation detector according to claim 1, wherein the reading circuit includes a first path via which pixel signals are read from a first pixel group among the plurality of pixels and a second path via which pixel signals are read from a second pixel group different from the first pixel group among the plurality of pixels, and wherein the processing unit is configured to determine the background component for each of the plurality of pixels by performing the filter processing on pixels which belong to one of the first pixel group and the second pixel group that includes the pixel whose background component is to be determined.

13. The radiation detector according to claim 1, further comprising a frame memory configured to store pixel signals for one frame read from the plurality of pixels, wherein the processing unit is configured to determine the background component by using the pixel signals stored in the frame memory.

14. The radiation detector according to claim 1, wherein the plurality of pixels include a conversion element formed of cadmium telluride or cadmium zinc telluride.

15. A radiation imaging system comprising:
a radiation source configured to irradiate an imaging objective with a radiation;
the radiation detector according to claim 1; and
a control unit configured to control an irradiation rate of the radiation such that an average number of photons or particles of the radiation irradiated per one pixel per one frame of the radiation detector becomes equal to or less than 0.5.

16. A radiation detector comprising:
a plurality of pixels configured to directly convert a radiation into an electric charge;
a reading circuit configured to read pixel signals from the plurality of pixels frame by frame; and
a processing unit configured to process the pixel signals read by the reading circuit,
wherein, for each of the plurality of pixels as a target pixel, the processing unit is configured to determine a background component contained in a pixel signal of the target pixel (i) by using values of the pixel signals read from the plurality of pixels in a frame in which the pixel signal of the target pixel is read and (ii) by performing filter processing on pixel signals of pixels in a predetermined filter region including the target pixel, and wherein, in the filter processing, the processing unit is configured to determine a mode of the pixel signals of the pixels in the filter region as a value of the background component for the target pixel in the frame.

17. The radiation detector according to claim 16, wherein the processing unit is configured to calculate a corrected datum in which the background component is subtracted from the pixel signal read by the reading circuit, and wherein the radiation detector is configured to output the corrected datum to an outside.

18. The radiation detector according to claim 16, further comprising a frame memory configured to store pixel signals for one frame read from the plurality of pixels, wherein the processing unit is configured to determine the background component by using the pixel signals stored in the frame memory.

19. A method for processing a radiation image, the method comprising:
reading pixel signals frame by frame from a plurality of pixels which are configured to directly convert a radiation into an electric charge; and
processing the pixel signals read from the plurality of pixels,
wherein in the processing step, for each of the plurality of pixels as a target pixel, a background component contained in a pixel signal of the target pixel is determined (i) by using values of the pixel signals read from the plurality of pixels in a frame in which the pixel signal of the target pixel is read and (ii) by performing filter processing on pixel signals of pixels in a predetermined filter region including the target pixel, and wherein, in the filter processing, a median of the pixel signals of the pixels in the filter region is determined as a value of the background component for the target pixel in the frame.

20. A non-transitory computer-readable storage medium storing a program for causing a computer to execute each step of the method according to claim 19.

* * * * *